United States Patent [19]

McDowell

[11] 4,103,913

[45] Aug. 1, 1978

[54] FRETTING CORROSION RESISTANT GASKET AND METHOD OF MAKING SAME

[75] Inventor: Donald J. McDowell, Riverside, Ill.

[73] Assignee: Felt Products Mfg. Co., Skokie, Ill.

[21] Appl. No.: 678,043

[22] Filed: Apr. 19, 1976

[51] Int. Cl.² .............................................. F16J 15/10
[52] U.S. Cl. .................... 277/235 B; 277/166
[58] Field of Search ............. 277/235 B, DIG. 6, 166

[56] References Cited

U.S. PATENT DOCUMENTS

| 2,074,388 | 3/1937 | Gordon | 277/235 B |
| 2,578,523 | 12/1951 | Llewellyn | 277/DIG. 6 |
| 2,600,321 | 6/1952 | Pyle | 277/DIG. 6 |
| 2,809,130 | 10/1957 | Rappaport | 277/DIG. 6 |
| 3,794,333 | 2/1974 | Czernik | 277/235 B |

*Primary Examiner*—Robert I. Smith
*Attorney, Agent, or Firm*—Dressler, Goldsmith, Clement, Gordon & Shore, Ltd.

[57] ABSTRACT

A multilayer engine gasket is provided for resisting scoring, scratching and fretting corrosion. The gasket includes a metal core or substrate, an intermediate phosphate layer and an exterior layer of anti-fretting material. The metal core is preferably formed of steel and is constructed and arranged to be mounted between an engine head and block of an internal combustion engine, such as a diesel engine. A pair of piston-size apertures and a plurality of oil and water passageways are defined in the metal core. The intermediate phosphate layer enhances the ability of the anti-fretting material to adhere to the gasket and provides and assists in resisting anti-fretting corrosion. The exterior layer of anti-fretting material is formulated from a ratio of from about 65 per cent to about 35 per cent polytetrafluoroethylene to a ratio from about 35 per cent to about 65 per cent molybdenum disulfide by weight. A separately screened-on silicone bead may optionally border the peripheral edges of the metal core so as to provide a peripheral seal.

3 Claims, 2 Drawing Figures

FRETTING CORROSION RESISTANT GASKET AND METHOD OF MAKING SAME

BACKGROUND OF THE INVENTION

This invention relates to a fluid seal, and more particularly, to a gasket adapted to be mounted between an engine head and block of an internal combustion engine, such as a diesel engine. In most automobile engines, and diesel engines, such as those used in power train engines, locomotives, trucks, road graders, tractors, electrical generators, marine engines and pumps, there exists a need for a gasket adapted to be mounted between the engine head and block. While some gaskets have been made out of fibrous materials, metal gaskets, and particularly steel gaskets, are particularly advantageous in certain environments. With the use of metal gaskets, a variety of problems have been confronted, among which is fretting.

Fretting, sometimes also referred to as fretting corrosion, is a serious problem and often causes failure of a seal. The phenomenon of fretting occurs in a gasket when it is placed between and in contact with the engine head and block, and is then subjected to a substantial compressive load or stress, together with high frequency and cyclic repetition rate of impulse forces and vibrations generated by the engine. The forces and vibrations tend to impart very slight relative movement between confronting metal surfaces such as between the gasket and the confronting block and head.

Fretting, resulting from the slight relative movement, causes surface pitting and deterioration to occur. This is usually accompanied by the formation of an oxide debris, which is reddish for steel. Fatigue cracks often start in the damaged area, although they may be obscured from observation by the surface debris. When the gasket is mounted in a diesel engine, such as in a truck, dust, abrasive particles and other road debris abrasively contact the gasket and contribute to fretting.

Fretting is caused by a combination of mechanical and chemical effects. Metal is removed from the surface either by a grinding action, or by alternative welding and tearing away of the high spots. The removed particles become oxidized and form an abrasive powder which continues the destructive process. Oxidation of the metal surface occurs and the oxide film is destroyed by the relative motion of the surfaces. When conditions are such that oxidation can occur, fretting damage is many times more severe.

Although fretting is frequently referred to as fretting corrosion, it is clear then that fretting is more related to wear resulting from grinding and the like then it is initially due to corrosion or fatigue. However, it differs from wear by the fact that the relative velocity of the contacting surfaces is much lower than is usually encountered in wear. Because the contacting surfaces are never brought out of contact, there is little or no chance for the corrosion products to be removed.

Although a number of efforts have been made to alleviate the problem of fretting corrosion in metal gaskets, the problem still remains a serious one in practice. For example, if all of the relative motion is prevented, then fretting will not occur. Increasing the forces normal to the surface may accomplish this. However the damage increases with the normal forces up to the point where relative motion is totally stopped and excessive forces are required to completely prevent relative movement. Exclusion of the atmosphere from the confronting surfaces will also reduce fretting, but this is frequently practically impossible to accomplish in automobile and diesel engines.

SUMMARY OF THE INVENTION

In accordance with the present invention, there is provided a gasket assembly adapted to be positioned between an engine block and head. The gasket assembly includes a metal gasket having first and second generally planar surfaces defining a plurality of piston-size apertures and fluid-flow passageways. At least one of the planar surfaces is coated with a layer of anti-fretting material comprising molybdenum disulfide and polytetrafluoroethylene for resisting fretting corrosion. The gasket assembly may further include a phosphate coating disposed on the metal gasket body intermediate the gasket body and the layer of molybdenum disulfide and polytetrafluoroethylene for enhancing the adherence of the layer to the gasket body.

The preferred thickness of the layer of molybdenum disulfide and polytetrafluoroethylene is between about 0.0005 and about 0.001 inch and the layer of anti-fretting material contains molybdenum disulfide and polytetrafluoroethylene in a ratio of from about 35 percent to about 65 percent molybdenum disulfide and from about 65 percent to about 35 percent polytetrafluoroethylene, by weight. The gasket assembly may also include a peripheral silicone seal which is applied to the phosphate coating in a region uncoated by anti-fretting material.

Of course, both Teflon and molybdenum disulfide have been used for their lubricating and related properties in gasketing applications previously. However, as far as applicant is aware, they have not been used in combination or in the ratios herein described or in combination with a phosphatized metallic gasket surface to provide, in combination, a gasket which resists fretting corrosion as does the gasket assembly of this invention.

One method of forming a gasket assembly in accordance with the present invention includes forming an engine gasket substantially of sheet metal, including shaping the gasket to define a plurality of piston-size apertures and a plurality of fluid-flow passageways; phosphatizing the gasket; mixing molybdenum disulfide with polytetrafluoroethylene to form an anti-fretting material and coating the gasket with the anti-fretting material.

Further objects, features and advantages of this invention will become apparent from the following description and drawings of which:

DETAILED DESCRIPTION OF THE ILLUSTRATIVE EMBODIMENT

Figure 1:
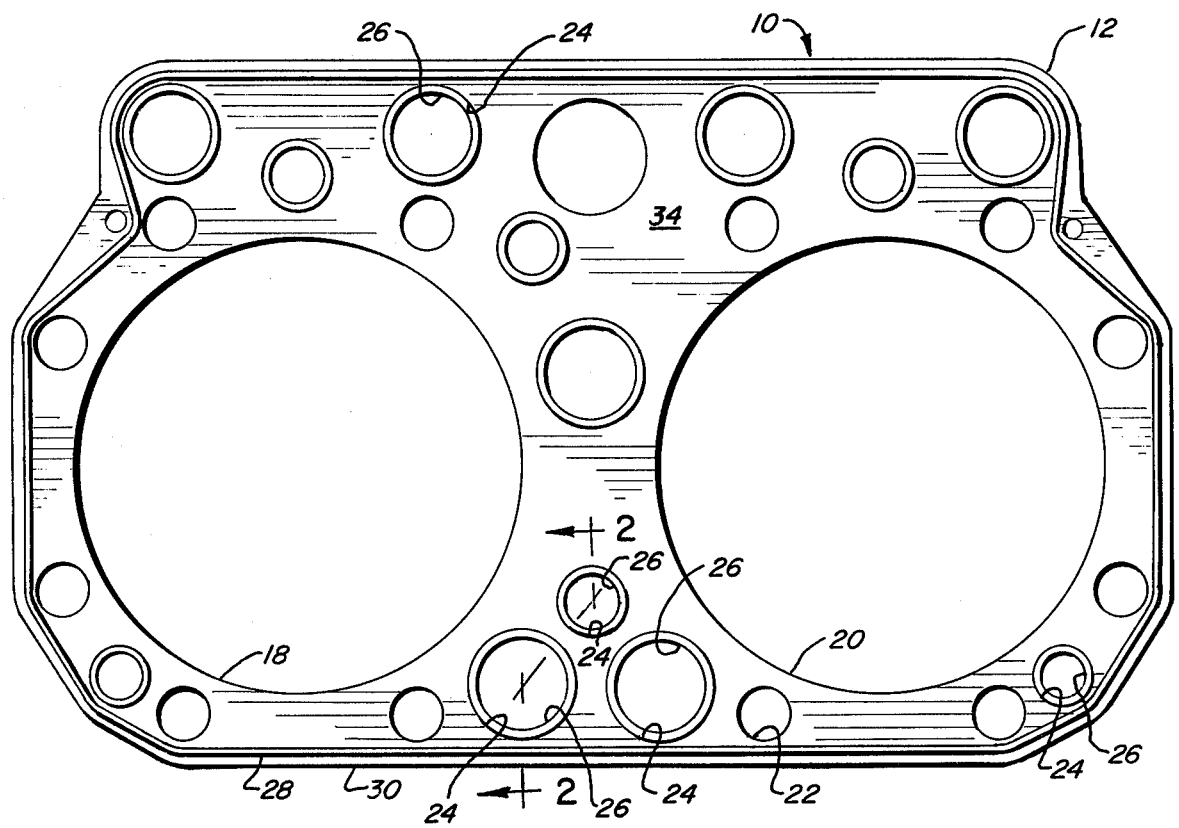
FIG. 1 is a top plan view of an anti-fretting diesel engine gasket assembly in accordance with principles of the present invention.
Figure 2:
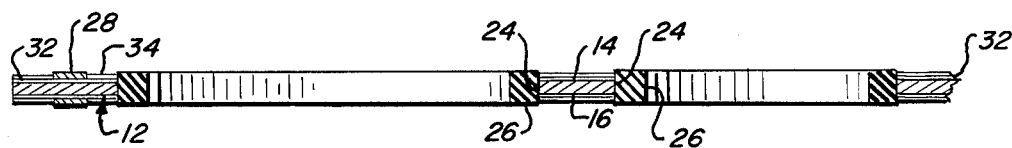
FIG. 2 is an enlarged cross-sectional view of a fragmentary portion of the anti-fretting diesel engine gasket assembly taken substantially along line 2—2 of FIG. 1.

Referring to the drawings, anti-fretting diesel engine gasket assembly 10 is especially configured and constructed to be used in a diesel engine. The anti-fretting diesel engine gasket assembly includes a generally flat core or metal gasket body 12 having an elongated top or first generally planar surface 14 and an elongated bottom or second generally planar surface 16. The top and bottom surfaces are generally parallel to each other.

The gasket body 12 is formed of metal to provide a metallic core and is die-cut or blanked out, such as with a stamping machine, punch press or other suitable forming equipment, to provide a pair of piston-size apertures or combustion openings 18 and 20, bolt holes 22, and a plurality of fluid flow passageways, such as oil and water passageways 24. A typical gasket body may have a configuration as shown in FIG. 1 and a thickness of about 0.060 inch, although other configurations and thicknesses may be used depending upon the configurations and requirements of the engines with which they are to be used. A plurality of grommets 26 are secured as by cementing to the walls of the gasket body forming the oil and water passageways 24. The grommets are preferably of a vinylidene fluoride-hexafluoropropylene copolymer. When desired, other elastomeric grommets or metal grommets may be used.

The gasket body is phosphatized or coated with a phosphate coating 32, a chemical conversion coating, in a conventional manner, such as by spraying, or immersion. Preferably, a zinc phosphate coating is used, although an iron phosphate coating or a manganese phosphate coating may be used when desired. The recommended weight of the zinc-phosphate coating is from about 500 milligrams to about 1500 milligrams per square foot of treated surface. The phosphatizing tends to etch the surfaces of the steel gasket somewhat and leaves a deposit of rough, course phosphate crystals on the surfaces of the gasket, thereby to provide relatively roughened and porous metal surfaces. These surfaces provide a matrix for holding an anti-fretting layer of polytetrafluoroethylene and molybdenum disulfide. The phosphate coating tends to enhance the corrosion resistance of the metal surfaces and also tends to resist fretting corrosion.

After the gasket has been phosphatized, a sealing bead 28, such as of red silicone sealant, may optionally be deposited, as by silk-screening, upon the top and/or bottom surfaces of the gasket body. The bead may be selectively deposited upon particularly troublesome areas of the gasket body where there is encountered substantial sealing problems. In the illustrative embodiment, the silicone sealing bead 28 forms a closed-loop peripheral seal at a position closely adjacent the peripheral edges 30 of the gasket body. The silicone bead is fixedly secured to the gasket body and generally provides a peripheral silicone seal.

After phosphatizing and subsequent to the application of the silicone bead, the gasket body is coated with a layer of anti-fretting material 34. Preferably, the gasket body is coated with the anti-fretting material at positions remote from the silicone bead, so as not to cover the silicone seal with the anti-fretting material. The anti-fretting material is preferaby a mixture of polytetrafluoroethylene, such as Teflon, and molybdenum disulfide. The applied layer of polytetrafluoroethylene and the molybdenum disulfide fills in the matrix resulting from the phosphatizing and thereby becomes bonded to the surfaces of the gasket body.

Preferably, both the top and bottom surfaces of the gasket body are coated with a substantially uniform layer of molybdenum disulfide and polytetrafluoroethylene in a thickness of from about 0.0005 and about 0.001 inch. The anti-fretting coating preferably contains molybdenum disulfide and polytetrafluoroethylene in a ratio of from about 35 percent to about 65 percent molybdenum disulfide and from about 65 percent to about 35 percent polytetrafluoroethylene by weight.

A typical suitable formulation for an anti-fretting coating of molybdenum disulfide and polytetrafluoroethylene in accordance with this invention, includes about 124 pounds (dry weight) of DuPont Teflon dispersion type 30 at 60.3 percent and 147 pounds of Molysulfide T.F. molybdenum disulfide, commercially available from Climax Molybdenum Company. Additionally, very small quantities of a wetting agent/defoamer, and a humectant are provided. A thickener such as 2-ethoxy ethanol, commercially known as Cellosolve solvent, and 12 pounds of methyl cellulose, having a viscosity of 15 cp, are provided for thickening to a desired viscosity. A pigment to provide any desired coloration may be added. In a preferred coating material, about 39 pounds of blue Teflon paste type GV-32251, commercially available from Ferro Corporation, was included. After the various ingredients were mixed and then applied and cured, substantially only polytetrafluoroethylene and molybdenum disulfide and pigment remained with a relatively insignificant amount of the methyl cellulose. The anti-fretting coating material can hold from about 0 percent to about 30 percent pigment, based upon the total dry weight of the anti-fretting material. While graphite is not as good as a lubricant as is molybdenum disulfide under heavy load conditions, in some circumstances, graphite may be substituted for molybdenum disulfide.

The molybdenum disulfide and polytetrafluoroethylene coating is preferably applied to the gasket body by means of a silk-screening process generally in accordance with the disclosure of U.S. Pat. No. 3,477,867. The anti-fretting coating may also be applied by spray or roller coater. When desired, the grommets may also be coated with the anti-fretting material.

It has been found that the phosphate coating enhances the ability of the polytetrafluoroethylene-molybdenum disulfide layer to adhere to the gasket body and provides capillaries and micro-cavities on the steel core to retain the molybdenum disulfide-polytetrafluoroethylene anti-fretting layer.

By mixing the molybdenum disulfide and the polytetrafluoroethylene in the proportions as described, a unique coating is provided which has not heretofore been known or appreciated in the gasket art. It minimizes, reduces, resists, and otherwise retards the phenomenon known as fretting corrosion. The anti-fretting layer therefore prolongs the useful life of the gasket and of the engine block-gasket-head assembly.

The coating also resists scoring and scratching, when mounted between the engine head and block of a diesel engine. The gasket assembly is able to withstand a substantial compressive load or stress along with a high frequency and periodic repetition rate of impulse forces and vibrations of the type generated by the diesel engine.

Although but one embodiment of the invention has been shown and described, it is to be understood that various modifications and substitutions may be made by those skilled in the art without departing from the novel spirit and scope of the invention.

What is claimed and desired to be secured by Letters Patent of the United States is:

1. A fretting corrosion resistant gasket assembly adapted to be positioned between an engine block and head, comprising:

a steel gasket body having first and second generally planar surfaces defining a plurality of piston-size apertures and a plurality of fluid flow passageways, and at least one of said surfaces having a roughened surface and being coated with a substantial uniform layer of a mixture of molybdenum disulfide and polytetrafluoroethylene in a ratio of from about 35 percent to about 65 percent molybdenum disulfide and from about 65 percent to about 35 percent polytetrafluoroethylene by weight, and wherein said layer is from about 0.0005 to about 0.001 inch thick, and wherein said layer serves to enhance resistance to fretting corrosion.

2. A gasket assembly as in claim 1 wherein said roughened surface comprises a phosphate coating on said body and intermediate the gasket body and said layer, thereby to provide a relatively roughened and porous surface to provide a matrix for holding said layer to said gasket body.

3. A gasket assembly as in claim 1 wherein each of said first and second surfaces are coated with a said layer of molybdenum disulfide and polytetrafluoroethylene.

* * * * *